(12) United States Patent
Ozawa et al.

(10) Patent No.: US 11,238,828 B2
(45) Date of Patent: Feb. 1, 2022

(54) METHOD OF CONTROLLING DISPLAY DEVICE AND DISPLAY DEVICE

(71) Applicant: SEIKO EPSON CORPORATION, Tokyo (JP)

(72) Inventors: Takaaki Ozawa, Shiojiri (JP); Yasuhiro Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/896,299

(22) Filed: Jun. 9, 2020

(65) Prior Publication Data
US 2020/0388240 A1  Dec. 10, 2020

(30) Foreign Application Priority Data

Jun. 10, 2019  (JP) .............................. JP2019-107733

(51) Int. Cl.
*G09G 5/00* (2006.01)
*G06T 3/40* (2006.01)

(52) U.S. Cl.
CPC ............... *G09G 5/003* (2013.01); *G06T 3/40* (2013.01); *G09G 2354/00* (2013.01); *G09G 2370/12* (2013.01)

(58) Field of Classification Search
CPC ....... G09G 5/003; G09G 2354/00; G06T 3/40
See application file for complete search history.

(56) References Cited

U.S. PATENT DOCUMENTS

| 2010/0259464 A1* | 10/2010 | Chang ................. H04M 1/7253 345/2.3 |
| 2015/0084857 A1* | 3/2015 | Kimura ................ G02B 27/017 345/156 |
| 2017/0111697 A1* | 4/2017 | Choi .................. H04N 21/4622 |

FOREIGN PATENT DOCUMENTS

| JP | 2005-252528 A | 9/2005 |
| JP | 2008-070512 A | 3/2008 |
| JP | 2011-128257 A | 6/2011 |

\* cited by examiner

*Primary Examiner* — Samantha (Yuehan) Wang
(74) *Attorney, Agent, or Firm* — Oliff PLC

(57) ABSTRACT

A method of controlling a display device according to the present disclosure includes the steps of executing input determination on whether or not the image information is input to the input interface, making the display section display an input state image including one of an input image representing that the image information is input and a non-input image representing that the image information is not input in accordance with a result of the input determination, making the display section display a display image based on the image information when receiving an operation of designating the input image, and making the display section display a procedure image representing a procedure of inputting the image information to the input interface when receiving an operation of designating the non-input image.

6 Claims, 11 Drawing Sheets

METHOD OF CONTROLLING DISPLAY DEVICE AND DISPLAY DEVICE

The present application is based on, and claims priority from JP Application Serial Number 2019-107733, filed Jun. 10, 2019, the disclosure of which is hereby incorporated by reference herein in its entirety.

BACKGROUND

1. Technical Field

The present disclosure relates to a method of controlling a display device and a display device.

2. Related Art

In general, the display device such as a projector is provided with an input interface including an input terminal to which image information is input from external equipment via a cable. The display device described in JP-A-2011-128257 (Document 1) determines whether or not the image information is currently input from the external equipment to the input terminal in the default setting when a start-up operation is performed. When it has been determined that the image information is currently input, the display device projects an image corresponding to the image information thus input. On the other hand, when it has been determined that the image information has not input to the input terminal in the default setting, the display device projects a confirmation image for prompting the connection of the cable to the input terminal. In the confirmation image, there are included, for example, an image in the vicinity of the input terminal in the display device, and an animation image showing a terminal shape of the cable to be coupled to the input terminal so as to make the user confirm whether or not the cable is correctly coupled to the input terminal.

In the display device described in Document 1, when the image information is not currently input to the input terminal in the default setting, the confirmation image is projected every time the display device starts up. There is a problem that it is cumbersome for the user used to the operation of the display device that the confirmation image is projected every time the display device starts up.

SUMMARY

A method of controlling a display device according to an aspect of the present disclosure is a method of controlling a display device including an input interface to which image information is input, and a display section configured to display an image, the method including the steps of executing input determination on whether or not the image information is input to the input interface, making the display section display an input state image including one of an input image representing that the image information is input and a non-input image representing that the image information is not input in accordance with a result of the input determination, making the display section display a display image based on the image information when receiving an operation of designating the input image in a state in which the input state image including the input image is displayed, and making the display section display a procedure image representing a procedure of inputting the image information to the input interface when receiving an operation of designating the non-input image in a state in which the input state image including the non-input image is displayed.

A method of controlling a display device according to an aspect of the present disclosure is a method of controlling a display device including a first input interface to which first image information is input, a second input interface to which second image information is input, and a display section configured to display an image, the method including the steps of executing first input determination of determining whether or not the first image information is input to the first input interface, and second input determination of determining whether or not the second image information is input to the second input interface, making the display section display an input state image including one of a first input image representing that the first image information was input and a first non-input image representing that the first image information was not input, and one of a second input image representing that the second image information is input and a second non-input image representing that the second image information is not input in accordance with results of the first input determination and the second input determination, making the display section display one of a first display image based on the first image information and a second display image based on the second image information in accordance with an operation of designating one of the first input image and the second input image when receiving the operation, and making the display section display one of a first procedure image representing a procedure of inputting the first image information to the first input interface and a second procedure image representing a procedure of inputting the second image information to the second input interface in accordance with an operation of designating one of the first non-input image and the second non-input image when receiving the operation.

A display device according to another aspect of the present disclosure includes a display section configured to display an image, an input interface to which image information is input, an input determination section configured to execute input determination on whether or not the image information is input to the input interface, and a display control section configured to make the display section display an input state image including one of an input image representing that the image information is input and a non-input image representing that the image information is not input in accordance with a result of the input determination, wherein the display control section makes the display section display a display image based on the image information when receiving an operation of designating the input image, and a procedure image representing a procedure of inputting the image information to the input interface when receiving an operation of designating the non-input image.

DESCRIPTION OF EXEMPLARY EMBODIMENTS

Some embodiments will hereinafter be described with reference to the drawings. It should be noted that in each of the drawings, the size and the scale of each of the constituents are arbitrarily different from actual ones. Further, the embodiments described hereinafter are added with a variety of technically preferable limitations, but the embodiments are not limited to these aspects.

1. First Embodiment

1A. Basic Configuration of Display System 1

Figure 1:
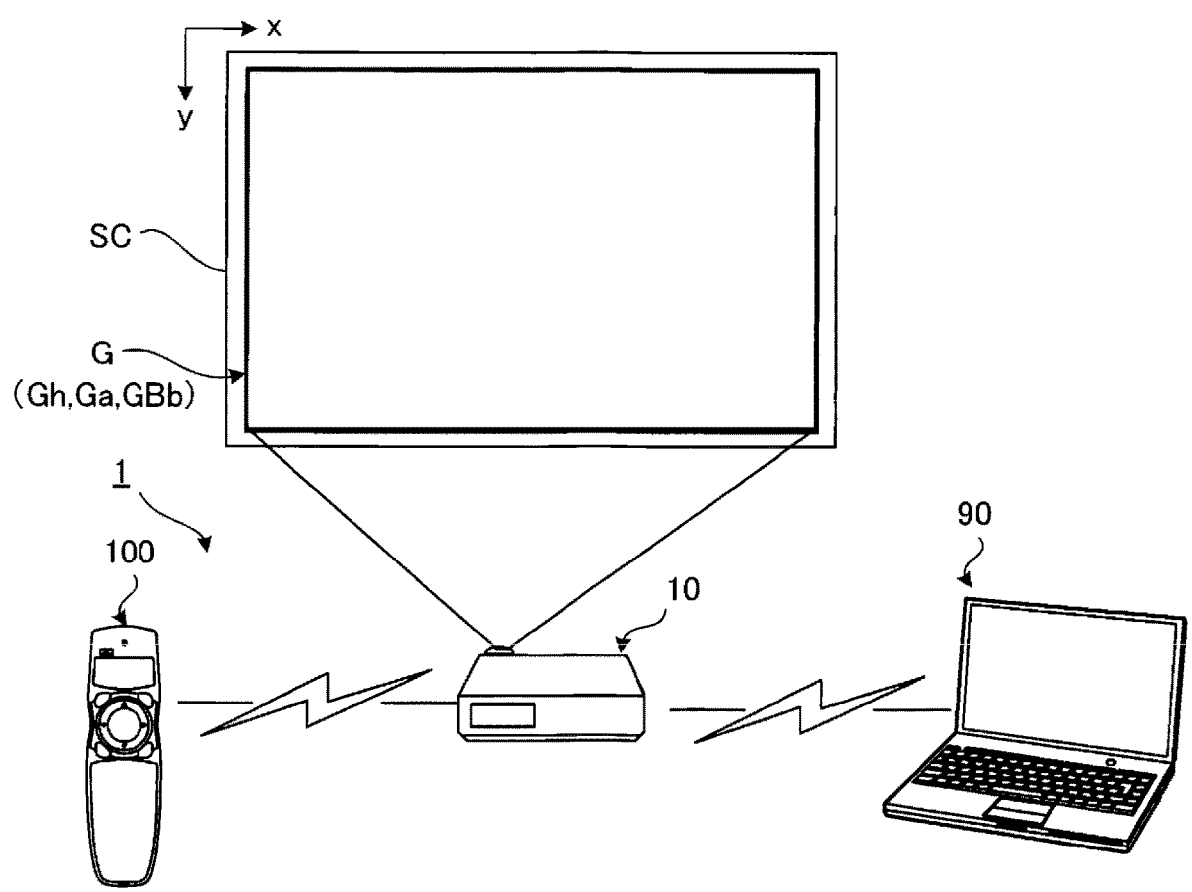
FIG. 1 is a schematic diagram showing a display system including a display device according to a first embodiment.

FIG. 1 is a schematic diagram showing a display system 1 including a display device 10 in a first embodiment. It should be noted that the description will hereinafter be presented arbitrarily using an x axis and a y axis in a screen SC described later. In the present embodiment, a display surface of the screen SC has a rectangular shape. The long sides are parallel to the +x direction, and short sides are parallel to the +y direction. It should be noted that the display surface is a surface on which an image G is displayed. In the present specification, the image G includes an image consisting only of characters besides a diagram and a picture.

The display system 1 shown in FIG. 1 is a projection system. The display system 1 has the display device 10 and a terminal device 100. The display device 10 is, for example, a projector. The terminal device 100 is a device for providing the display device 10 with a variety of instructions. Specifically, the terminal device 100 is, for example, a remote controller. The terminal device 100 has a plurality of operators for allowing the user to make a variety of settings of the display device 10. Further, the terminal device 100 is coupled to the display device 10 so as to be able to communicate with each other. The coupling between the terminal device 100 and the display device 10 can be achieved wirelessly or with wire. It should be noted that the terminal device 100 can also be, for example, a personal computer, a smartphone, or a tablet terminal.

To the display device 10, there is coupled an external device 90 for supplying the display device 10 with image information so as to be able to communicate with each other in addition to the terminal device 100. The image information is an electric signal of the image G. The coupling between the external device 90 and the display device 10 can be achieved wirelessly or with wire. The external device 90 is, for example, a personal computer. It should be noted that the external device 90 can also be a smartphone, a tablet terminal, a DVD (Digital Versatile Disk) player, or the like. Further, the display device 10 can be coupled to a plurality of external devices 90.

In the present embodiment, the display device 10 projects the image G on the screen SC. Although described later in detail, as the image G, there can be cited, for example, an input state image Gh shown in FIG. 3 through FIG. 5, a display image Ga shown in FIG. 6, and a procedure image Gb shown in FIG. 7 through FIG. 9. The input state image Gh is an image showing whether or not the image information is currently input from the external device 90 to the display device 10. Further, the input state image Gh also functions as a home image used for allowing the user to operate the display device 10. The display image Ga is an image formed based on the image information. The procedure image Gb is an image showing a procedure of the input of the image information from the external device 90 to the display device 10. Further, the image G can be a still image, or can also be a moving image. Further, as the installation place of a variety of screens SC, there can be cited, for example, a wall, a floor, a table, a ceiling, and a dedicated installation stand. Further, the display device 10 is provided with a speaker for outputting a sound.

It is possible for the user of the display device 10 shown in FIG. 1 to make a variety of settings of the display device 10 by operating the operators of the terminal device 100 with half an eye on the image G. Each of the operators is, for example, a button with a pressure sensor. The terminal device 100 has a power button for powering on or off the display device 10, an arrow key for selecting a variety of items the image G has, a decision button for deciding the selection, and so on. For example, by operating the terminal device 100 via the input state image Gh, it is possible for the user to make the setting of switching the display from the input state image Gh to the display image Ga or the procedure image Gb. As the other variety of settings for the display device 10, there can be cited, for example, an image quality setting such as brightness, contrast, and color depth, a setting of input resolution, a setting of an aspect ratio, a setting of a display position, a setting of a geometric distortion correction, and a zoom setting.

1B. Configuration of Display Device 10

Figure 2:
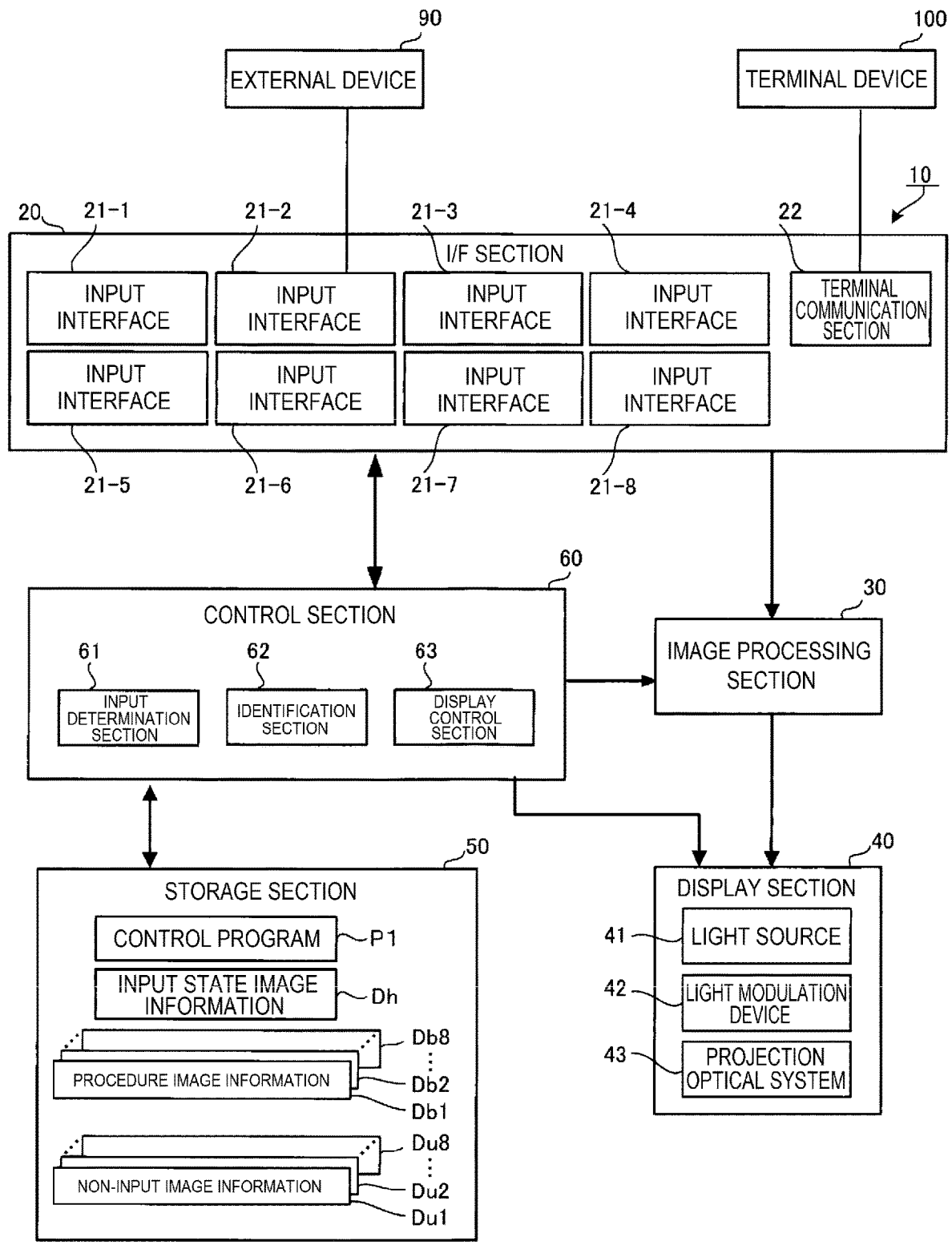
FIG. 2 is a block diagram showing the display device according to the first embodiment.

FIG. 2 is a block diagram showing the display device 10 in the first embodiment. As shown in FIG. 2, the display device 10 has an I/F (interface) section 20, an image processing section 30, a display section 40, a storage section 50, and a control section 60.

1B-1. I/F Section 20

The I/F section 20 is provided with input interfaces 21-1, 21-2, 21-3, 21-4, 21-5, 21-6, 21-7, and 21-8 and a terminal communication section 22. It should be noted that the input interfaces 21-1 through 21-8 are described as "input interfaces 21" when not distinguished from each other. The plurality of input interfaces 21 is each coupled to corresponding one of the external devices 90 so as to be able to communicate with each other. To each of the input interfaces 21, there is input the image information from corresponding one of the external devices 90. The image information is input to the image processing section 30 or stored in the storage section 50. It should be noted that in FIG. 2, there is illustrated when the external device 90 is coupled only to the input interface 21-2 out of the input interfaces 21-1 through 21-8. Further, although the number of the interfaces 21 is 8 in the present embodiment, the number of the input interfaces can be 1 through 7, or can also be not smaller than 9.

The input interface 21 has an input circuit including, for example, an input terminal and an AD converter. Specifically, for example, as the input interface 21, there can be cited an interface including a D-subminiature terminal, an interface including an HDMI (High-Definition Multimedia Interface) terminal, an interface including a USB terminal, an interface including an HDBaseT terminal, and an interface including a LAN (Local Area Network) terminal. Further, the input interface 21 can also be a wireless communication interface such as Wi-Fi or Bluetooth. It should be noted that HDMI, Wi-Fi, and Bluetooth are each a registered trademark. Further, the input interfaces 21-1 through 21-8 can be the same in standard as each other, or can also be different in standard from each other.

Although the detailed illustration is omitted, in the present embodiment, the input interfaces 21-1, 21-2, and 21-3 are each the interface including the HDMI terminal. The input interface 21-4 is the interface including the D-subminiature terminal. The input interface 21-5 is an interface including a wireless HDMI terminal for executing ScreenMirroring. The input interface 21-6 is a wireless communication interface compliant with Wi-Fi. The input interface 21-7 is the interface including the USB terminal. The input interface 21-8 is the interface including the HDBaseT terminal. It should be noted that the specific example of these input interfaces 21-1 through 21-8 is illustrative only, and is not a limitation.

The terminal communication section 22 is coupled to the terminal device 100 so as to be able to communicate with each other. The terminal communication section 22 receives an operation to the terminal device 100. The terminal communication section 22 is an interface to be coupled to the terminal device 100 using, for example, infrared communication. Further, the terminal communication section 22 can also be a wireless communication interface such as Wi-Fi or Bluetooth. It should be noted that when providing an operator to the display device 10, the terminal communication section 22 can be eliminated. Further, it is also possible to use one of the input interfaces 21 described above as the terminal communication section 22. In this case, the terminal communication section 22 can be eliminated.

1B-2. Image Processing Section 30

The image processing section 30 performs a variety of types of image processing on the image information provided from the input interfaces 21 or the image information stored in the storage section 50, and then inputs the image information on which the image processing has been performed to the display section 40. The image processing section 30 has, for example, a frame memory. The image processing section 30 develops the image information on the frame memory, and then performs a variety of types of image processing such as a resolution conversion process, a resizing process, and a distortion correction process as needed.

1B-3. Display Section 40

The display section 40 is a projection device for generating image light based on the image information on which the image processing has been performed, and then projecting the image light on the screen SC to display the image G.

The display section 40 has a light source 41, a light modulation device 42, and a projection optical system 43.

The light source 41 includes, for example, a halogen lamp, a xenon lamp, a super-high pressure mercury lamp, an LED (Light Emitting Diode), or a laser source. The light source 41, for example, emits red light, green light, and blue light separately from each other, or emits white light. When the light source 41 emits the white light, the light emitted from the light source 41 is reduced in unevenness of the luminance distribution by an integrator optical system not shown, and is then separated by a color separation optical system not shown into the red light, the green light, and the blue light, and then enters the light modulation device 42. The light modulation device 42 includes three light modulation elements provided so as to correspond to the red light, the green light, and the blue light. The three light modulation elements are each configured including, for example, a transmissive liquid crystal panel, a reflective liquid crystal panel, or a DMD (Digital Mirror Device). The three light modulation elements respectively modulate the red light, the green light, and the blue light to generate the image light of the respective colors. The image light beams of the respective colors generated in the light modulation device 42 are combined by a color combining optical system to turn to full-color image light. The projection optical system 43 images to project the full-color image light on the screen SC. The projection optical system 43 is an optical system including at least one projection lens. The projection optical system 43 can also include a zoom lens and a focus lens.

1B-4. Storage Section 50

The storage section 50 is a storage device for storing the control program P1 to be executed by the control section 60. Further, the storage section 50 stores input state image information Dh, eight pieces of procedure image information Db-1, Db-2, ..., Db-8, and eight pieces of non-input image information Du-1, Du-2, ..., Du-8. The input state image information Dh is data for forming the input state image Gh. Further, one piece of the procedure image information Db corresponds to one input interface 21. Each piece of the procedure image information Db-1, Db-2, ..., Db-8 is the data for forming the corresponding procedure image Gb. Further, one piece of the non-input image information Du corresponds to one input interface 21. Each piece of the non-input image information Du-1, Du-2, ..., Du-8 is the data for forming a corresponding non-input image Gu. The non-input image Gu is an image representing the fact that the image information has not yet been input to the input interface 21. The non-input image Gu is included in the input state image Gh. It should be noted that the non-input image Gu will be described later in detail.

It should be noted that the procedure image information Db-1, Db-2, ..., Db-8 is described as the "procedure image information Db" when not distinguished from each other. The non-input image information Du-1, Du-2, ..., Du-8 is described as the "non-input image information Du" when not distinguished from each other. The number of pieces of the non-input image information Du and the number of the input interfaces 21 are equal to each other. One piece of the non-input image information Du corresponds to one input interface 21.

The storage section 50 includes a volatile storage section and a nonvolatile storage section. The volatile storage section means a storage section which cannot keep the information stored unless the power is supplied. As an example of the nonvolatile storage section, there can be cited a hard disk. The nonvolatile storage section means a storage device which can keep the information stored even when the power is not supplied. Further, as an example of the volatile storage section, there can be cited a RAM (Random Access Memory). The volatile storage section is used as a work area for storing the information to be processed by the control section 60 and a work area when executing the control program P1. It should be noted that a part or the whole of the storage section 50 can also be provided to an external storage device of the display device 10 or a server.

1B-5. Control Section 60

The control section 60 is a processing device having a function of controlling each section of the display device and a function of processing a variety of types of information. The control section 60 includes a processor such as a CPU (Central Processing Unit). The control section 60 retrieves the control program P1 from the storage section 50 to execute the control program P1 to thereby realize a variety of functions including functional sections described later. It should be noted that the control section 60 can be formed of a single processor, or can also be constituted by a plurality of processors. Further, some or all of the functions of the control section 60 can also be realized by hardware such as a DSP (Digital Signal Processor), an ASIC (Application Specific Integrated Circuit), a PLD (Programmable Logic Device), or an FPGA (Field Programmable Gate Array). Further, the control section 60 can be integrated with the image processing section 30 described above.

The control section 60 retrieves the control program P1 from the storage section 50 to execute the control program P1 to thereby function as an input determination section 61, an identification section 62, and a display control section 63.

The input determination section 61 executes input determination on whether or not the image information has already been input from the external device 90 with respect to each of the input interfaces 21. The input determination section 61 monitors the input of the image information from the external device 90 with respect to each of the input interfaces 21 to determine whether or not a change from a state in which the image information has not yet been input to a state in which the image information has already been input has occurred, or a change from the state in which the image information has already been input to the state in which the image information has not yet been input has occurred.

The identification section 62 identifies the content of the operation to the terminal device 100 by the user via the input state image Gh. The identification section 62 identifies the content of the operation in accordance with the operation to the terminal device 100 received by the terminal communication section 22.

The display control section 63 makes the display section 40 display a variety of types of images G such as the input state image Gh, the display image Ga, and the procedure image Gb. Specifically, the display control section 63 generates or updates the input state image information Dh in accordance with presence or absence of the input of the image information. Further, the display control section 63 makes the image processing section 30 perform the image processing on the input state image information Dh, and then makes the display section 40 display the input state image Gh formed based on the input state image information Dh. Further, the display control section 63 makes the image processing section 30 perform the image processing on the image information input to the input interface 21, and then makes the display section 40 display the display image Ga formed based on the image information. Further, the display control section 63 makes the image processing section 30 perform the image processing on the procedure image information Db corresponding to the input interface 21, and then makes the display section 40 display the procedure image Gb formed based on the procedure image information Db.

1C. Image G

1C-1. Input State Image Gh

Figure 3:
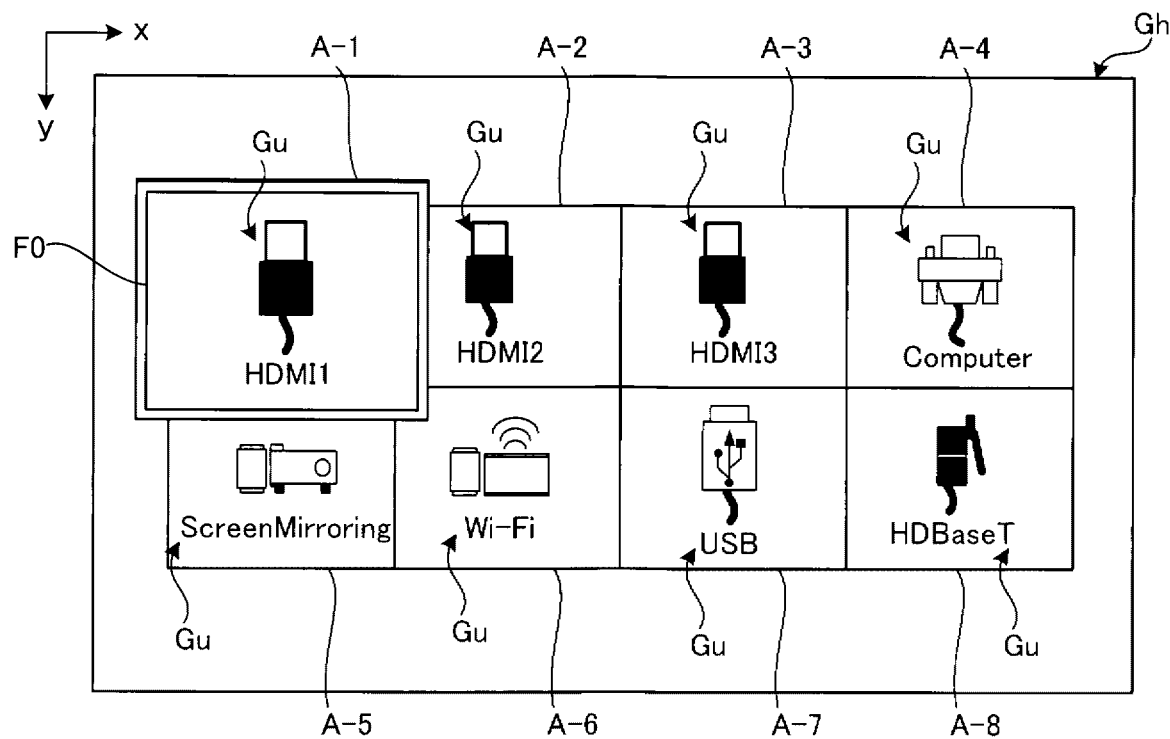
FIG. 3 is a diagram showing an example of an input state image to be displayed by a display section in the first embodiment.
Figure 4:
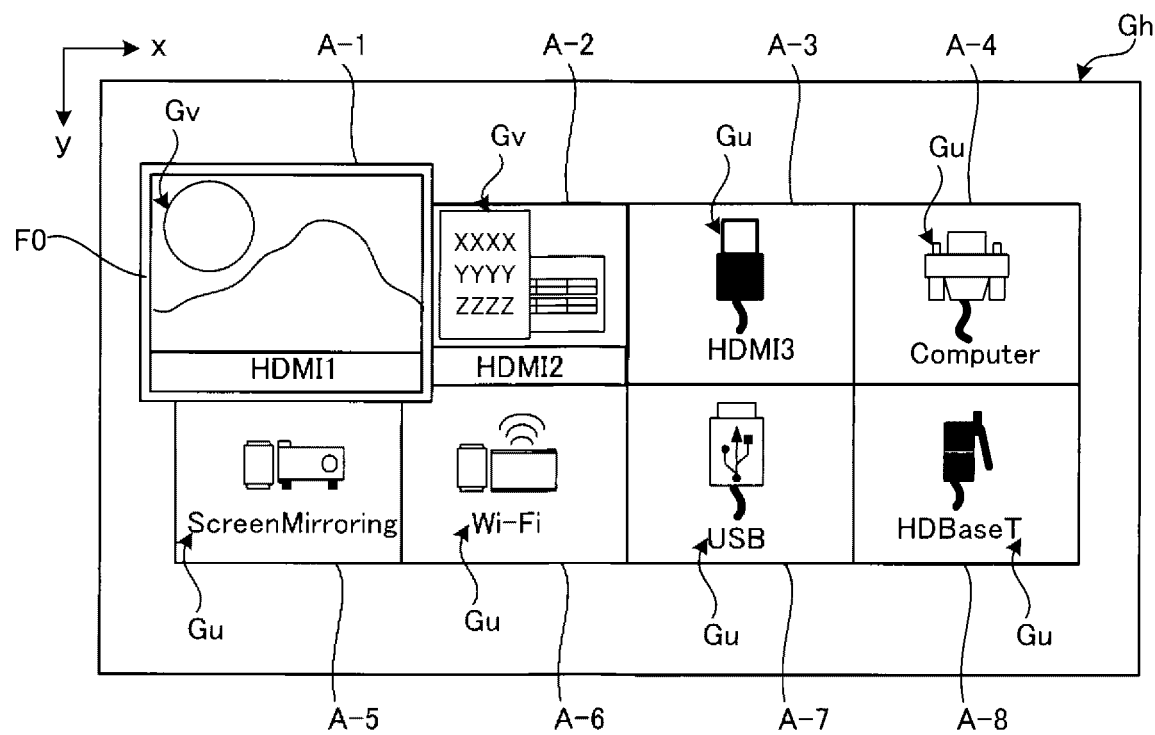
FIG. 4 is a diagram showing an example of the input state image to be displayed by the display section in the first embodiment.
Figure 5:
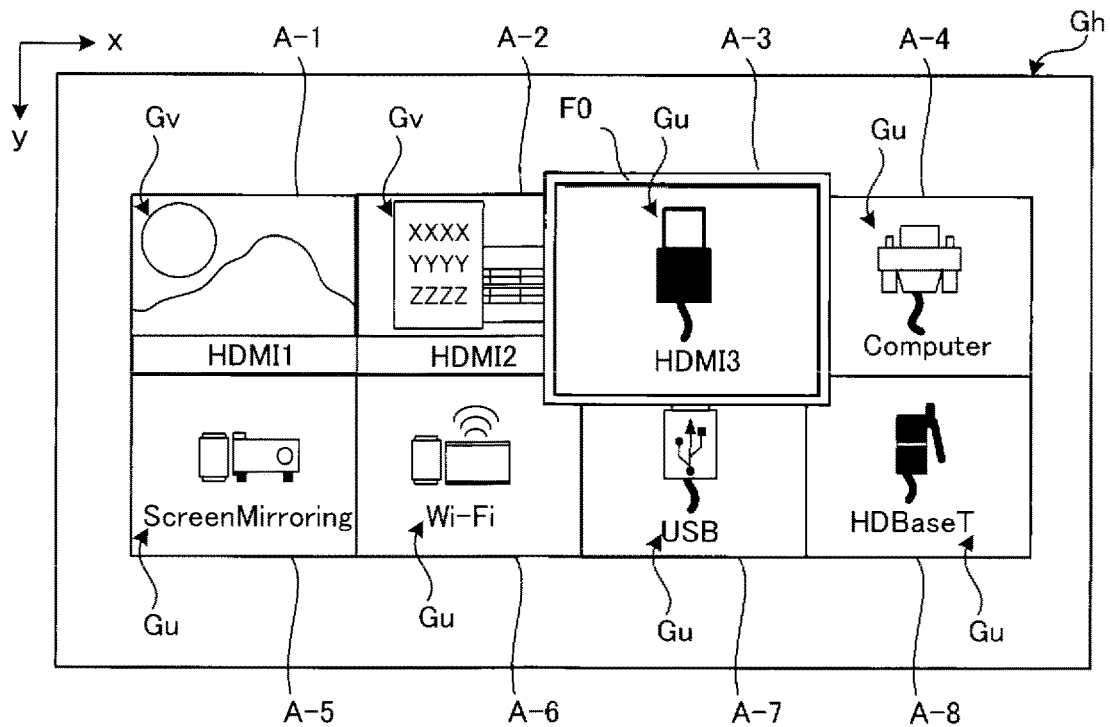
FIG. 5 is a diagram showing an example of the input state image to be displayed by the display section in the first embodiment.

FIG. 3, FIG. 4, and FIG. 5 are each a diagram showing an example of the input state image Gh to be displayed by the display section 40 in the first embodiment.

The input state image Gh shown in FIG. 3, FIG. 4, or FIG. 5 has eight individual areas A-1 through A-8 used for showing whether or not the input of the image information from the external device 90 to the input interface 21 is completed. It should be noted that the individual areas A-1 through A-8 are described as the "individual areas A" when not distinguished from each other. The number of the individual areas A and the number of the input interfaces 21 are equal to each other. One individual area A corresponds to one input interface 21. In the present embodiment, the individual area A-1 corresponds to the input interface 21-1. The individual area A-2 corresponds to the input interface 21-2. The individual area A-3 corresponds to the input interface 21-3. The individual area A-4 corresponds to the input interface 21-4. The individual area A-5 corresponds to the input interface 21-5. The individual area A-6 corresponds to the input interface 21-6. The individual area A-7 corresponds to the input interface 21-7. The individual area A-8 corresponds to the input interface 21-8.

In the illustration, the individual areas A each have a quadrangular shape. The individual areas A-1 through A-8 are arranged in a matrix along the +x direction and the +y direction. It should be noted that the number, the arrangement, and the shapes of the individual areas A are not limited to the example shown in the drawings, but are arbitrary. For example, when the display device 10 has just one input interface 21, the number of the individual areas A can be one. Further, the individual areas A-1 through A-8 are not limited to the example shown in the drawings, but are arbitrary. For example, it is possible for the individual areas A-1 through A-8 to be arranged in a descending order of the rate of utilization of the input interfaces 21-1 through 21-8.

The input state image Gh shown in FIG. 3 shows the state in which the image information is input to none of the input interfaces 21. Therefore, in each of the individual areas A shown in FIG. 3, there is displayed the non-input image Gu representing the fact that the image information has not been input to the input interface 21. The non-input image Gu is formed based on the non-input image information Du stored in the storage section 50. The non-input image Gu is, for example, an icon for simply showing the content related to the input interface 21. Specifically, for example, the non-input image Gu includes a name such as the standard name of the input interface 21, a function to be executed by the display device 10 to which the external device 90 is coupled, or a figure representing an appearance of the input interface 21.

Further, the display content of the non-input image Gu is different for each input interface 21. Therefore, the non-input image Gu has a function as an identification image used to allow the user to identify the plurality of input interfaces 21. In particular, since the non-input image Gu is an icon as described above, it is possible for the user to identify the plurality of input interfaces 21 at a glance. It should be noted that it is sufficient for the non-input image Gu to make it possible for the user to recognize that the image information has not yet been input to the input interface 21, and the icon is not a limitation. For example, it is also possible for the non-input image Gu to be formed of a message representing the fact that the input has not yet been done.

The input state image Gh shown in FIG. 4 represents the state in which the image information is input to the input interfaces 21-1 and 21-2 out of the input interfaces 21-1 through 21-8. Therefore, in each of the individual areas A-3 through A-8 shown in FIG. 4, there is displayed the non-input image Gu representing the fact that the image information has not yet been input to the input interface 21 similarly to FIG. 3. On the other hand, in each of the individual areas A-1 and A-2 shown in FIG. 4, there is displayed an input image Gv representing the fact that the image information has been input to the input interface 21. The input image Gv is formed based on the image information input to the input interface 21. For example, in the individual area A-1 shown in FIG. 4, there is displayed the input image Gv representing a scenery having the moon and a mountain as subjects. In the individual area A-2 shown in FIG. 4, there is displayed the input image Gv representing a document and a table.

The input image Gv is, for example, a thumbnail image obtained by reducing the display image Ga. The thumbnail image can be a still image, or can also be a moving image. When the image information related to a moving image is input to the input interface 21, the thumbnail image as the moving image is formed by, for example, reducing the frame rate of the image information. Further, even when the image information related to the moving image is input, it is also possible for the thumbnail image to be a still image obtained by capturing the moving image.

Further, while the non-input image Gu is an icon as described above, the input image Gv is a thumbnail image. Therefore, it is easy for the user to figure out a difference between the non-input image Gu and the input image Gv. Therefore, it is possible for the user to easily recognize the fact that the image information has already been input to the input interface 21 by visually recognizing the input image Gv. It should be noted that it is sufficient for the input image Gv to make it possible for the user to recognize that the image information has already been input to the input interface 21, and the thumbnail image is not a limitation. For example, it is also possible for the input image Gv to be formed of a message representing the fact that the input has already been done.

As described above, in the input state image Gh, the input image Gv or the non-input image Gu is displayed for each of the input interfaces 21. Therefore, it is possible for the user to figure out whether or not the image information has already been input at a glance with respect to the plurality of input interfaces 21. Further, it is possible for the user to figure out the classification of the input interface 21 to which the image information has already been input at a glance.

Further, it is possible for the user to select one individual area A out of the plurality of individual areas A. In other words, it is possible for the user to select one input interface 21 out of the plurality of input interfaces 21. For example, it is possible for the user to select one of the individual areas A by operating the arrow key provided to the terminal device 100.

For example, the display control section 63 receives the operation with the arrow key of the terminal device 100 by the user, and then makes the display section 40 change the display from the input state image Gh shown in FIG. 4 to the input state image Gh shown in FIG. 5. Further, in the input state image Gh, in order to show the user the fact that the individual area A is selected, the individual area A selected is highlighted compared to the individual areas A not selected. In the input state image Gh shown in FIG. 4, the individual area A-1 is highlighted. Specifically, the individual area A-1 is displayed in a relatively enlarged manner, and at the same time, surrounded by a white frame F0. It should be noted that the highlighting of the individual area A is not limited to the illustrated example, but can also be, for example, a display with the background color changed.

1C-2. Display Image Ga

Figure 6:
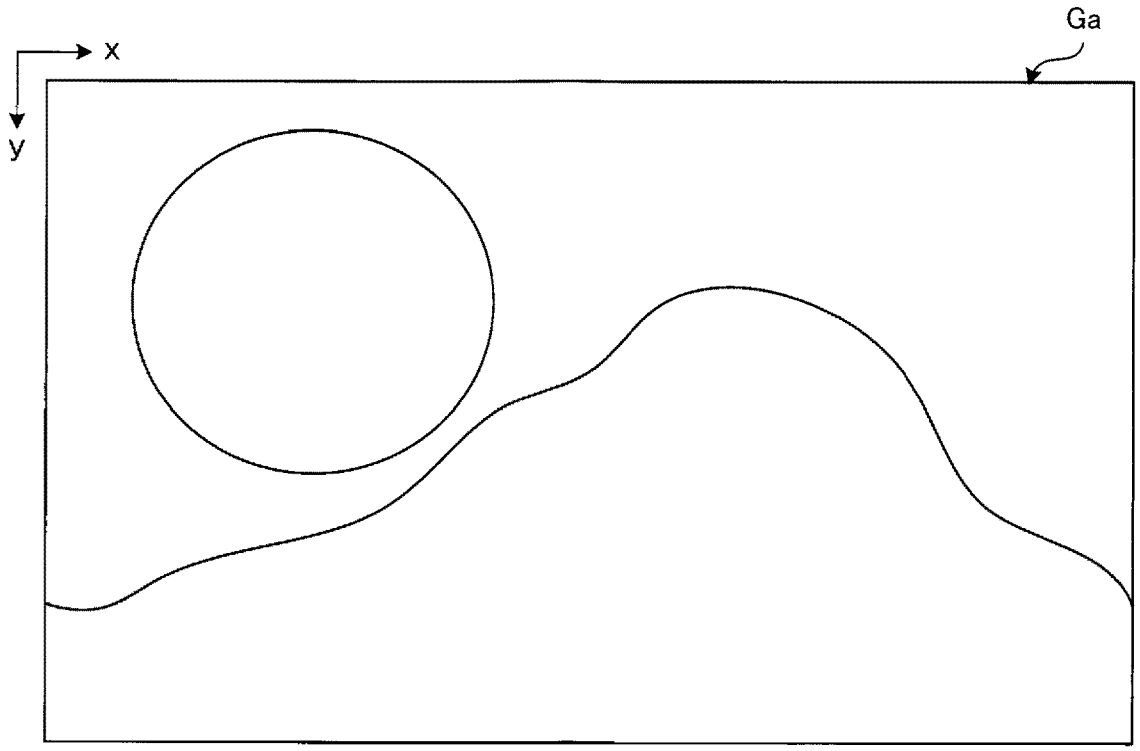
FIG. 6 is a diagram showing an example of a display image to be displayed by the display section in the first embodiment.

FIG. 6 is a diagram showing an example of the display image Ga in the first embodiment. The display control section 63 receives the operation of designating the input image Gv included in the input state image Gh, and then makes the display section 40 display the display image Ga based on the image information input to the input interface 21 corresponding to the input image Gv. The operation of designating the input image Gv means an operation to the terminal device 100 for deciding the selection of the input image Gv.

For example, when receiving the operation of the decision button provided to the terminal device 100 by the user while displaying the input state image Gh in which the individual area A-1 is displayed in an enlarged manner as shown in FIG. 4, the selection of the input image Gv displayed in the individual area A-1 is decided. Therefore, the terminal communication section 22 receives the designation of the input image Gv displayed in the individual area A-1. When receiving the designation of the input image Gv, the display control section 63 makes the display section 40 display the display image Ga shown in FIG. 6 based on the image information input to the input interface 21-1. In the present embodiment, the display control section 63 makes the display section 40 change the display from the input state image Gh shown in FIG. 4 to the display image Ga shown in FIG. 6.

1C-3. Procedure Image Gb

Figure 7:
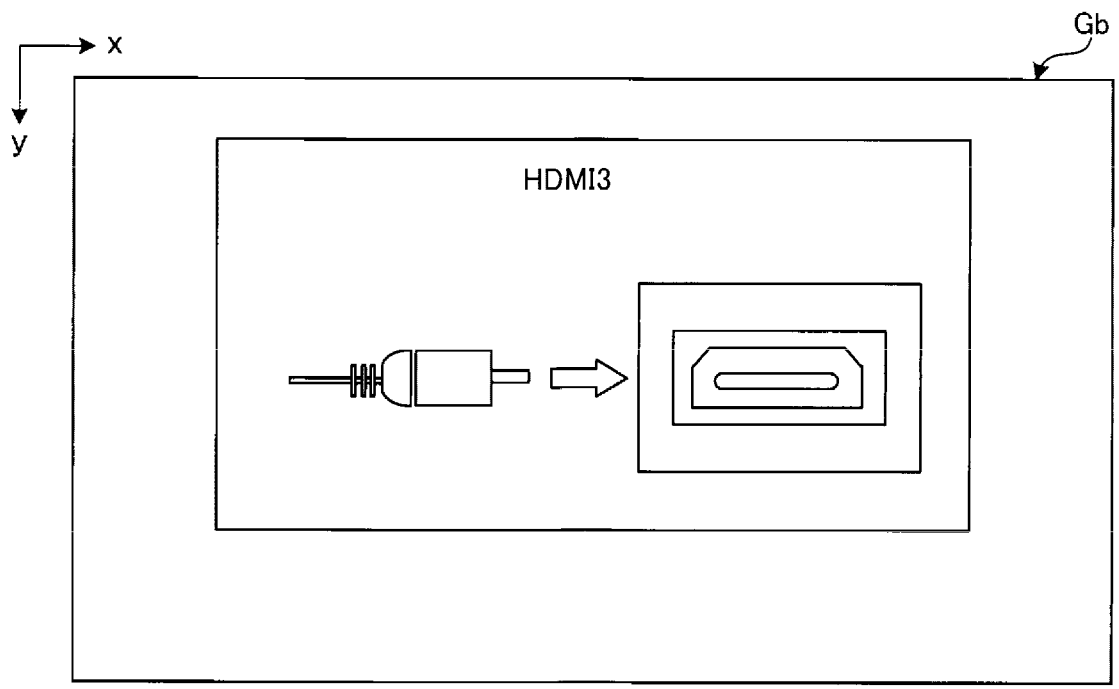
FIG. 7 is a diagram showing an example of a procedure image to be displayed by the display section in the first embodiment.
Figure 8:
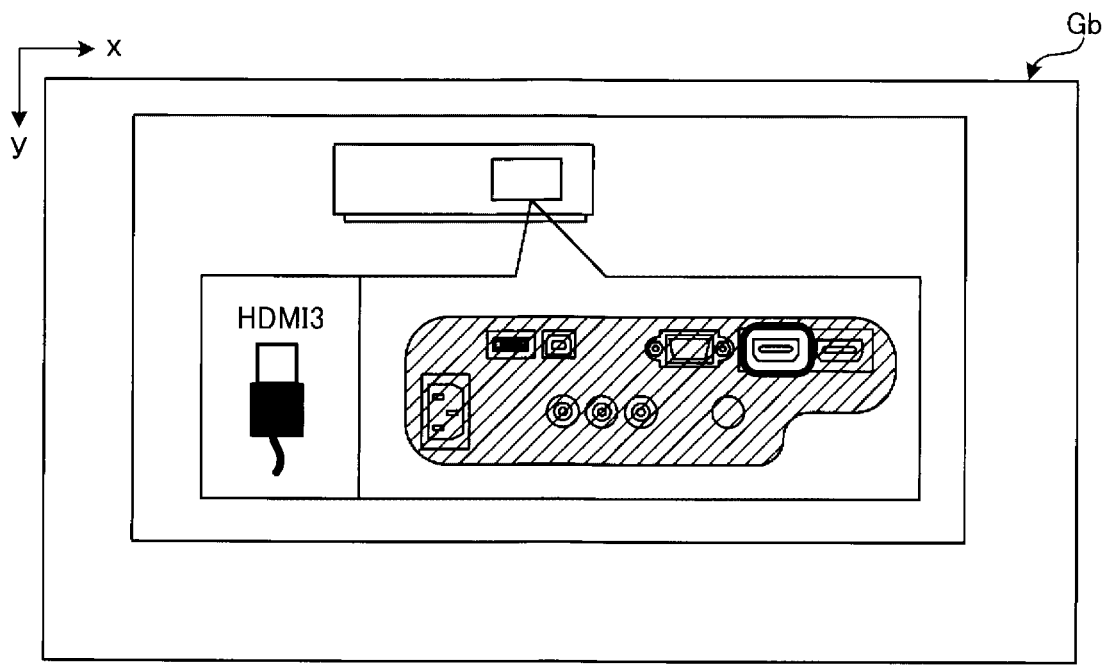
FIG. 8 is a diagram showing an example of the procedure image to be displayed by the display section in the first embodiment.

FIG. 7 and FIG. 8 are each a diagram showing an example of the procedure image Gb in the first embodiment. The display control section 63 receives the operation of designating the non-input image Gu included in the input state image Gh, and then makes the display section 40 display the procedure image Gb corresponding to the input interface 21 corresponding to the non-input image Gu. The operation of designating the non-input image Gu means an operation to the terminal device 100 for deciding the selection of the non-input image Gu.

For example, when receiving the operation of the decision button provided to the terminal device 100 by the user while displaying the input state image Gh in which the individual area A-3 is displayed in an enlarged manner as shown in FIG. 5, the selection of the non-input image Gu displayed in the individual area A-3 is decided. In other words, the terminal communication section 22 receives the designation to the non-input image Gu displayed in the individual area A-3. When receiving the designation of the non-input image Gu, the display control section 63 makes the display section 40 sequentially display the procedure image Gb shown in, for example, FIG. 7 and FIG. 8 based on the procedure image information Db-3 corresponding to the input interface 21-3. In the present embodiment, the display control section 63 makes the display section 40 change the display from the input state image Gh shown in FIG. 5 to the procedure image Gb shown in FIG. 7 and FIG. 8.

The procedure image Gb shown in FIG. 7 and FIG. 8 has, for example, a slide-show format. The procedure image Gb shown in FIG. 7 is displayed first, and then, the procedure image Gb shown in FIG. 8 is displayed. The display of these procedure images Gb can also be performed together with a voice explaining the coupling method. In the procedure image Gb shown in FIG. 7, there are displayed the name of the input terminal, the shape of the input terminal, and the shape of the connector to be coupled to the input terminal. In the procedure image Gb shown in FIG. 8, there is displayed a drawing in the vicinity of the input terminal in the display device 10.

Figure 9:
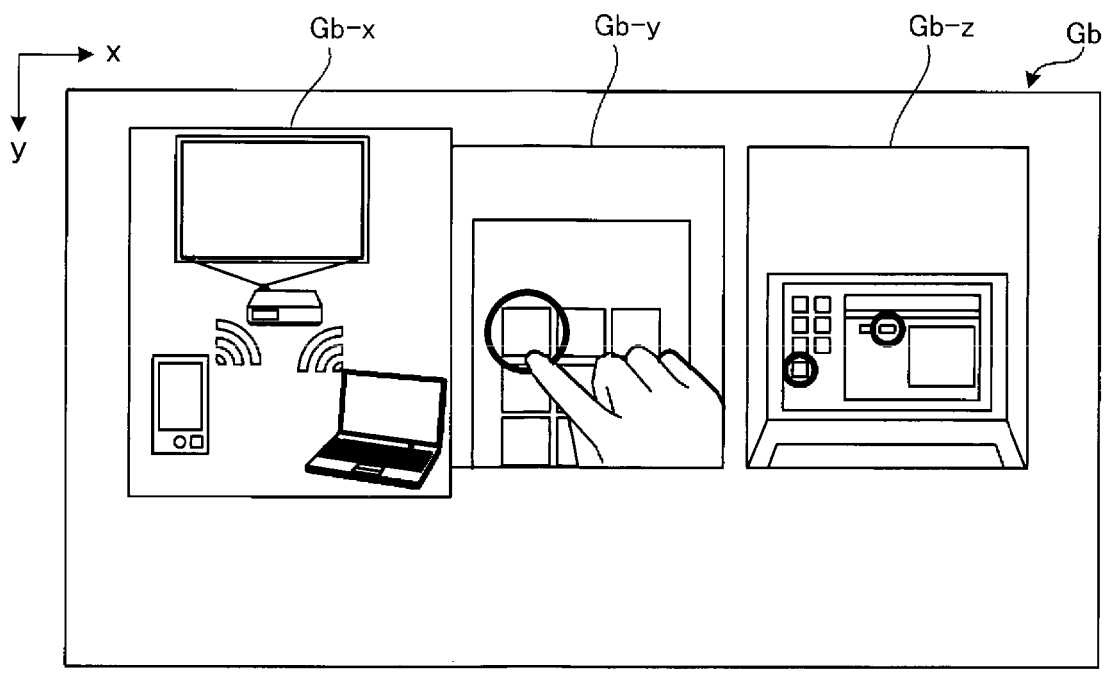
FIG. 9 is a diagram showing an example of the procedure image to be displayed by the display section in the first embodiment.

FIG. 9 shows some drawings each representing an example of the procedure image Gb in the first embodiment. For example, when receiving the operation of the decision button provided to the terminal device 100 by the user while displaying the input state image Gh in which the individual area A-6 is displayed in an enlarged manner, the selection of the non-input image Gu displayed in the individual area A-6 is decided. In other words, the terminal communication section 22 receives the designation to the non-input image Gu displayed in the individual area A-6. When receiving the designation of the non-input image Gu, the display control section 63 makes the display section 40 display the procedure image Gb shown in, for example, FIG. 9 based on the procedure image information Db-6 corresponding to the input interface 21-6.

The procedure image Gb shown in FIG. 9 includes a plurality of explanatory images Gb-x, Gb-y, and Gb-z. These explanatory images Gb-x, Gb-y, and Gb-z are displayed in an enlarged manner in this order. In the explanatory image Gb-x, there are displayed diagrams of the external devices 90 which can be coupled to the input interface 21-6. In each of the explanatory images Gb-y and Gb-z, there is displayed the procedure of the operation of the external device 90.

It is possible for the user to easily figure out the procedure of the input of the image information to the input interface 21 by looking at the procedure images Gb as shown in FIG. 7 through FIG. 9. Therefore, by coupling the external device 90 to the input interface 21 along the procedure images Gb, it is possible to easily input the image information to the input interface 21.

As described above, the display device 10 has the display section 40, the input interfaces 21, and the control section 60. The control section 60 has the input determination section 61 and the display control section 63. As described above, the input determination section 61 executes input determination on whether or not the image information has already been input to each of the input interfaces 21. The display control section 63 makes the display section 40 display the input state image Gh including one of the input image Gv and the non-input image Gu for each of the input interfaces 21 in accordance with the result of the input determination. Then, when receiving the operation for designating the input image Gv, the display control section 63 makes the display section 40 display the display image Ga. In contrast, when receiving the operation of designating the non-input image Gu, the display control section 63 makes the display section 40 display the procedure image Gb representing the procedure of inputting the image information to the input interface 21.

According to such a display device 10, when the operation of designating the input image Gv or the non-input image Gu has been received, the display image Ga or the procedure image Gb is displayed. Therefore, it is possible for the user to make the display device 10 display the display image Ga or the procedure image Gb at the own timing. Therefore, it is possible to reduce the botherance that the procedure image Gb is displayed when the display device 10 is powered on and when the display device 10 is reset.

Further, as described above, when receiving the operation for designating the input image Gv, the display control section 63 makes the display section 40 change the display of the input state image Gh to the display of the display image Ga. Further, when receiving the operation for designating the non-input image Gu, the display control section 63 makes the display section 40 change the display of the input state image Gh to the display of the procedure image Gb. Therefore, the display image Ga or the procedure image Gb is not displayed so as to be superimposed on the input state image Gh. Therefore, it is possible to avoid the deterioration of the visibility compared to when the display image Ga or the procedure image Gb smaller in size than the input state image Gh is displayed so as to be superimposed on the input state image Gh. It should be noted that the display image Ga and the procedure image Gb can each be displayed so as to be superimposed on the input state image Gh.

1D. Method of Controlling Display Device 10

Figure 10:
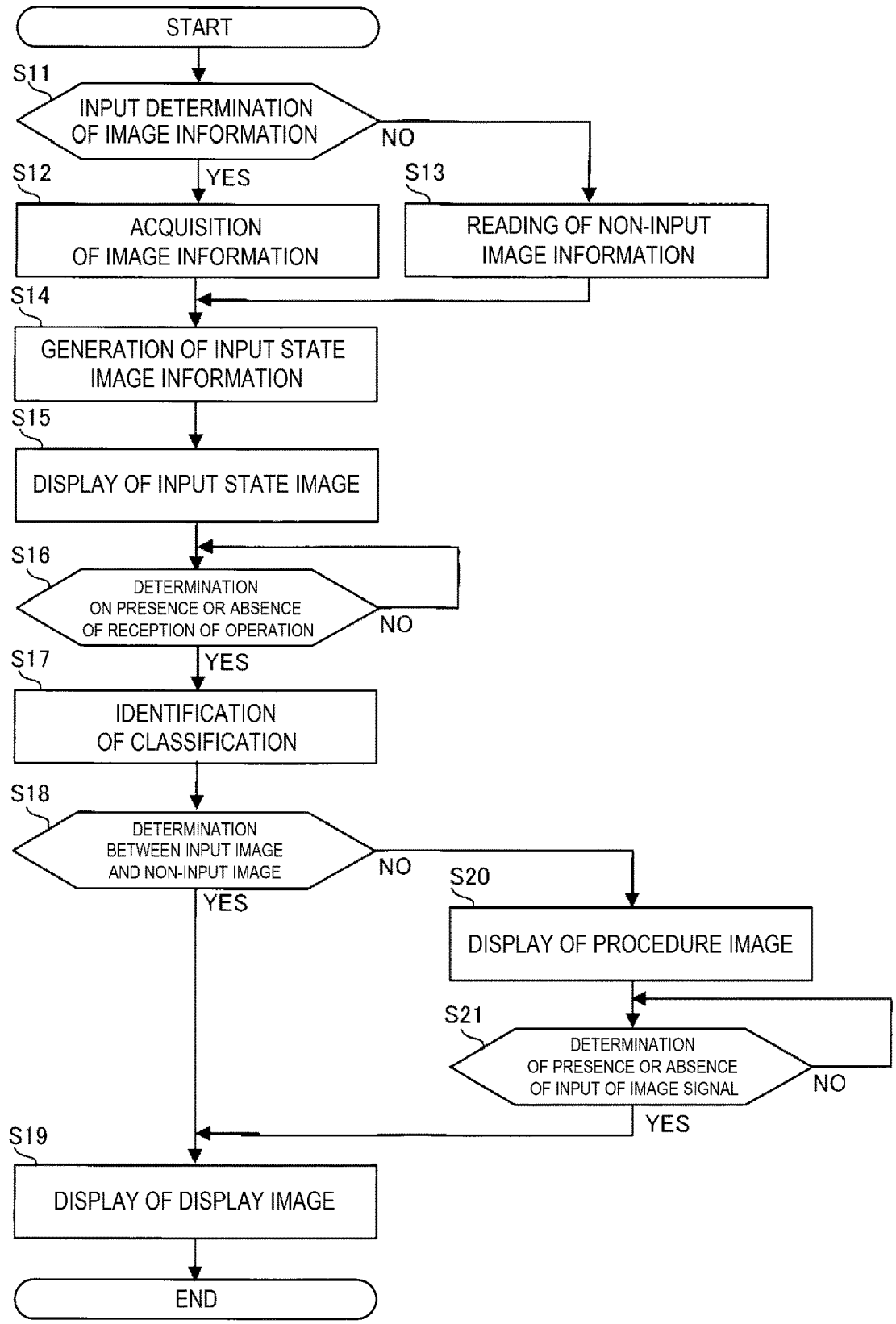
FIG. 10 is a flowchart showing a method of controlling a display device according to the first embodiment.

FIG. 10 is a flowchart showing a method of controlling the display device 10 according to the first embodiment. The method of controlling the display device 10, in particular, the method of controlling the display section 40 by the control section 60, will be described.

The control section 60 retrieves the control program P1 from the storage section 50 and then starts to execute the control program P1 in response to the fact that the display device 10 is powered on or reset due to the operation to the terminal device 100 by the user as a trigger. The control section 60 executes the control method represented by the flowchart shown in FIG. 10 along the control program P1.

Firstly, in the step S11, the input determination section 61 executes the input determination of the image information for each of the input interfaces 21. The input determination section 61 executes the input determination on whether or not the image information has already been input from the external device 90 with respect to each of the plural input interfaces 21.

In accordance with the result of the input determination, the identification section 62 executes either one of the acquisition of the image information in the step S12 and reading of the non-input image information Du in the step S13. Specifically, when it has been determined by the input determination section 61 that the image information has already been input, namely in the case of YES in the step S11, the display control section 63 executes the process in the step S12. In the step S12, the display control section 63 identifies the input interface 21 to which the image information has already been input, to obtain the image information. On the other hand, when it has been determined by the input determination section 61 that the image information has not yet been input, namely in the case of NO in the step S11, the display control section 63 executes the process in the step S13. In the step S13, the display control section 63 identifies the input interface 21 to which the image information has not yet been input, and then retrieves the non-input image information Du corresponding to that input interface 21 from the nonvolatile storage section of the storage section 50.

In the step S14, the display control section 63 generates or updates the input state image information Dh. Specifically, the display control section 63 retrieves the input state image information Dh from the nonvolatile storage section of the storage section 50. Subsequently, the display control section 63 refers to the image information in the step S12 or the non-input image information Du in the step S13 to newly generate or update the input state image information Dh for each of the input interfaces 21.

For example, when the image information has been input to none of the input interfaces 21, the display control section 63 generates the input state image information Dh related to the input state image Gh shown in FIG. 3. Further, when the image information has been input only to the input interfaces 21-1 and 21-2, for example, the display control section 63 generates the input state image information Dh related to the input state image Gh shown in FIG. 4.

In the step S16, the display control section 63 outputs the input state image information Dh generated in the step S14 to the image processing section 30, and then makes the display section 40 display the input state image Gh formed based on the input state image information Dh.

For example, when the image information has been input to none of the input interfaces 21, the non-input image Gu is displayed in each of the individual areas A in the input state image Gh as shown in FIG. 3. Further, for example, when the image information has been input only to the input interfaces 21-1 and 21-2, the input image Gv is displayed in each of the individual areas A-1 and A-2 provided to the input state image Gh as shown in FIG. 4.

In the step S17, the identification section 62 determines whether or not the terminal communication section 22 has received the operation of designating the input image Gv or the non-input image Gu while displaying the input state image Gh. The identification section 62 repeats the determination on whether or not the operation of designating the input image Gv or non-input image Gu has been received until the operation of designating the input image Gv or the non-input image Gu is received, namely in the case of NO in the step S16. On the other hand, when the operation of designating the input image Gv or the non-input image Gu has been received, namely in the case of YES in the step S16, the identification section 62 executes the process in the step S17.

In the step S17, the identification section 62 identifies the classification of the input interface 21 corresponding to the input image Gv or the non-input image Gu thus designated based on the information output from the terminal communication section 22. In the step S18, the identification section 62 determines which one of the input image Gv and the non-input image Gu is designated by the operation performed based on the information output from the terminal communication section 22. In other words, the identification section 62 determines whether or not the image information has been input to the corresponding input interface 21.

When it has been determined in the step S18 that the input information Gv has been designated, namely in the case of YES in the step S18, the display control section 63 executes the process in the step S19. In the step S19, the display control section 63 outputs the image information to the image processing section 30, and then makes the display section 40 display the display image Ga formed based on the image information. For example, when the input image Gv displayed in the individual area A-1 is designated in the input state image Gh shown in FIG. 4, the display section 40 displays the display image Ga shown in FIG. 6.

When it has been determined in the step S18 that the non-input image Gu has been designated, namely in the case of NO in the step S18, the display control section 63 executes the process in the step S20. In the step S20, the display control section 63 retrieves the procedure image information Db from the nonvolatile storage section of the storage section 50, outputs the procedure image information Db to the image processing section 30, and makes the display section 40 display the procedure image Gb formed based on the procedure image information Db. For example, when the input image Gv displayed in the individual area A-3 is designated in the input state image Gh shown in FIG. 5, the display section 40 sequentially displays the procedure image Gb shown in FIG. 7 and the procedure image Gb shown in FIG. 8.

In the step S21, the identification section 62 determines whether or not the image information has been input to the input interface 21-3. When the image information has not been input to the input interface 21-3, namely in the case of NO in the step S21, the identification section 62 repeats the determination on whether or not the image information has been input to the input interface 21-3. In contrast, when the image information has been input to the input interface 21-3, namely in the case of YES in the step S21, the display control section 63 executes the process in the step S19. When the image information is input to the input interface 21-3 while displaying the procedure image Gb shown in FIG. 7 or FIG. 8, the display control section 63 makes the display section 40 display the display image Ga based on the image information input to the input interface 21-3.

As described hereinabove, the method of controlling the display device 10 includes execution of the input determination of the image information in the step S11, display of the input state image Gh in the step S15, display of the display image Ga in the step S19, and display of the procedure image Gb in the step S20. As described above, in the step S11, the input determination section 61 executes the input determination on whether or not the image information has already been input for each of the input interfaces 21. In the step S13, the display control section 63 makes the display section 40 display the input state image Gh including one of the input image Gv and the non-input image Gu for each of the input interfaces 21 in accordance with the result of the input determination. Then, when it has been determined that the operation to the input image Gv has been received in the state in which the input state image Gh including the input image Gv has been displayed, the display control section 63 makes the display section 40 display the display image Ga. On the other hand, when it has been determined that the operation to the non-input image Gu has been received in the state in which the input state image Gh including the non-input image Gu has been displayed, the display control section 63 makes the display section 40 display the procedure image Gb.

By the operation of the terminal device 100 to the display device 10 via the input state image Gh, it is possible for the user to designate whether to display the display image Ga or the procedure image Gb on the screen SC. Therefore, it is possible for the user to make the display device 10 display the display image Ga or the procedure image Gb at the own timing. Therefore, it is possible to reduce the botheration that the procedure image Gb is displayed at the time of startup and reset. Further, when the image information has been input to the input interface 21, it is prevented that the display image Ga based on the image information is unexpectedly displayed at the time of startup and reset.

Further, as described above, when the image information is input to the input interface 21 while displaying the procedure image Gb, the display control section 63 stops the display of the procedure image Gb to make the display section 40 display the display image Ga. In other words, when the image information is input to the input information 21 with half an eye on the procedure image Gb, it is possible for the user to immediately see the display image Ga based on the image information. Therefore, it is possible for the user to start to see the display image Ga by performing the operation of inputting the image information to the input interface 21 using the procedure image Gb at the own timing.

Further, as described above, the input image Gv is a thumbnail image obtained by reducing the display image Ga. Therefore, by looking at the thumbnail image, it is possible for the user to figure out the content of the image information from the external device 90 coupled to the input interface 21 at a glance in addition to the fact that the external device 90 is coupled to the input interface 21. Therefore, when it is desired to see the display image Ga based on the image information, by performing an operation to the desired input image Gv, it is possible for the user to start to see the desired display image Ga at the own timing.

Further, as described above, the display device 10 has the plurality of input interfaces 21. Further, the display control section 63 makes the display section 40 display the input state image Gh including one of the input image Gv and the non-input image Gu for each of the input interfaces 21 in accordance with the input determination with respect to each of the plural input interfaces 21. Further, when receiving the operation of designating the input image Gv corresponding to any one of the input interfaces 21, the display control section 63 makes the display section 40 display the display image Ga corresponding to the input image Gv thus received in accordance with this operation. In contrast, when receiving the operation of designating the non-input image Gu corresponding to anyone of the input interfaces 21, the display control section 63 makes the display section 40 display the procedure image Gb corresponding to the non-input image Gu thus received in accordance with this operation.

Since the input state image Gh representing whether or not the image information has been input is displayed for each of the input interfaces 21, it is possible for the user to figure out whether or not the image information has been input to each of the input interfaces 21 at a glance. Further, by performing the operation of designating the input image Gv or the non-input image Gu corresponding to any one of the plural input interfaces 21, it is possible for the user to start to see the desired display image Ga or the procedure image Gb at the own timing.

For example, there is assumed a case of focusing attention on the two input interfaces, namely the input interfaces 21-1 and 21-2. In this case, the input determination section 61 executes the input determination of determining whether or not the image information has been input to the input interface 21-1, and the input determination of determining whether or not the image information has been input to the input interface 21-2. The input interface 21-1 corresponds to, for example, a "first input interface," and the input interface 21-2 corresponds to, for example, a "second input interface." In this case, the image information input to the input interface 21-1 corresponds to "first image information," and the image information input to the input interface 21-2 corresponds to "second image information." Further, the input determination of the input interface 21-1 corresponds to "first input determination," and the input determination of the input interface 21-2 corresponds to "second input determination."

The display control section 63 makes the display section 40 display the input state image Gh including one of the input image Gv and the non-input image Gu corresponding to the input interface 21-1, and one of the input image Gv and the non-input image Gu corresponding to the input interface 21-2. The input image Gv corresponding to the input interface 21-1 corresponds to a "first input image," and the non-input image Gu corresponding to the input interface 21-1 corresponds to a "first non-input image." The input image Gv corresponding to the input interface 21-2 corresponds to a "second input image," and the non-input image Gu corresponding to the input interface 21-2 corresponds to a "second non-input image."

Further, when the display control section 63 receives the instruction to one of the input image Gv corresponding to the input interface 21-1 and the input image Gv corresponding to the input interface 21-2, the display control section 63 makes the display section 40 display the display image Ga based on the image information input to the input interface 21-1 or the input interface 21-2 in accordance with the instruction. Meanwhile, when the display control section 63 receives the instruction to one of the non-input image Gu corresponding to the input interface 21-1 and the non-input image Gu corresponding to the input interface 21-2, the display control section 63 makes the display section 40 display the procedure image Gb corresponding to the input interface 21-1 or the input interface 21-2 in accordance with the instruction. The display image Ga corresponding to the input interface 21-1 corresponds to a "first display image," and the display image Ga corresponding to the input interface 21-2 corresponds to a "second display image." Further, the procedure image Gb corresponding to the input interface 21-1 corresponds to a "first procedure image," and the procedure image Gb corresponding to the input interface 21-2 corresponds to a "second procedure image."

Since the input state image Gh representing whether or not the image information has been input to each of two input interfaces, namely the input interfaces 21-1 and 21-2, is displayed, it is possible for the user to figure out whether or not the image information has been input to each of the two input interfaces, namely the input interfaces 21-1 and 21-2 at a glance. Further, by performing the operation of designating the input image Gv or the non-input image Gu corresponding to either one of the two input interfaces 21, it is possible for the user to start to see the display image Ga or the procedure image Gb corresponding to either one of the two input interfaces 21 at the own timing.

It should be noted that the "first input interface" is not limited to the input interface 21-1, but can be any one of the input interfaces 21-2 through 21-8. It is sufficient for the "second input interfaces" to be another input interface 21 than the "first input interface." Therefore, the "second input interface" is not limited to the input interface 21-2, but can be any one of the input interfaces 21-1, 21-3 through 21-8.

2. Second Embodiment

Figure 11:
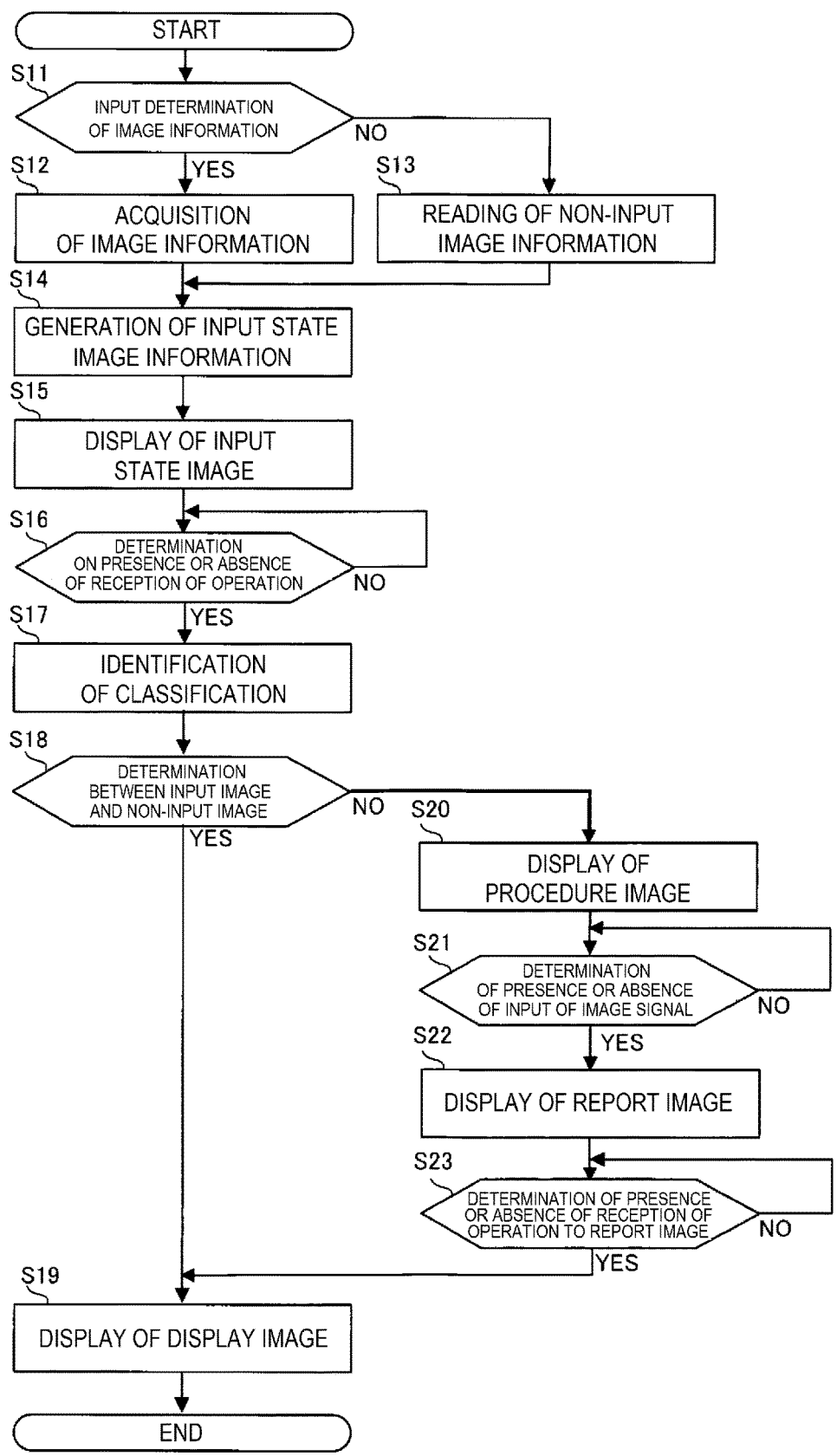
FIG. 11 is a flowchart showing a method of controlling a display device according to a second embodiment.
Figure 12:
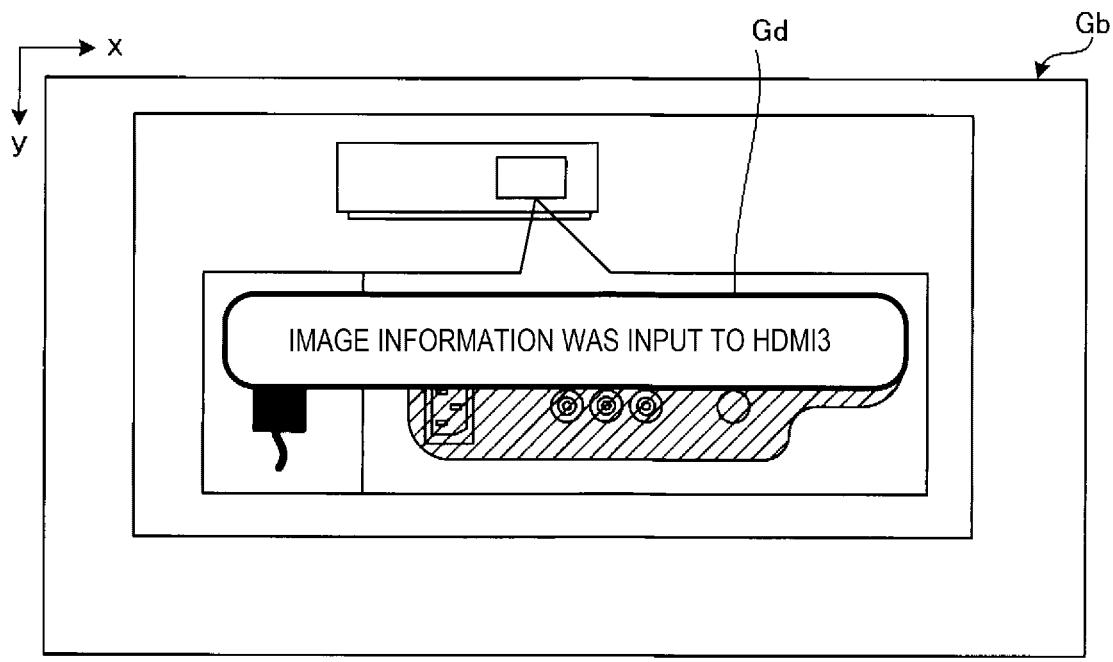
FIG. 12 is a diagram showing an example of a report image in the second embodiment.

Then, a second embodiment of the present disclosure will be described. FIG. 11 is a flowchart showing a method of controlling the display device 10 according to the second embodiment. FIG. 12 is a diagram showing an example of a report image Gd in the second embodiment. The present embodiment is different from the first embodiment in the point that the steps S22 and S23 are provided. It should be noted that in the second embodiment, the detailed description of each of substantially the same matters as those of the first embodiment will arbitrarily be omitted using the same reference symbols as used in the description of the first embodiment.

As shown in FIG. 11, in the step S21, when the image information is input to the input interface 21 while displaying the procedure image Gb, the display control section 63 executes the process in the step S22. In the step S22, the display control section 63 displays such a report image Gd as shown in FIG. 12. The report image Gd includes a message representing the fact that the image information has already been input to the input interface 21. The report image Gd is displayed as a pop-up on, for example, the procedure image Gb. When the user see such a report image Gd, it is possible for the user to figure out the fact that the image information has been input to the input interface 21.

Further, when the identification section 62 has received a designation to the report image Gd with the terminal device 100 by the user, namely in the case of YES in the step S23, the display control section 63 executes the process in the step S19. In the step S19, the display control section 63 makes the display section 40 display the display image Ga based on the image information. As described above, it is possible for the user to start to see the desired display image Ga by performing the operation to the report image Gd.

It should be noted that in the case of NO in the step S22, the identification section 62 repeats the determination on whether or not the designation to the report image Gd with the terminal device 100 by the user has been received. It should be noted that in the case of NO in the step S22, it is possible to display the input state image Gh when, for example, the identification section 62 has not received the designation until a predetermined time has elapsed. In the input state image Gh, there is displayed the input image Gv corresponding to the input interface 21 to which the image information has newly been input.

3. Third Embodiment

Figure 13:
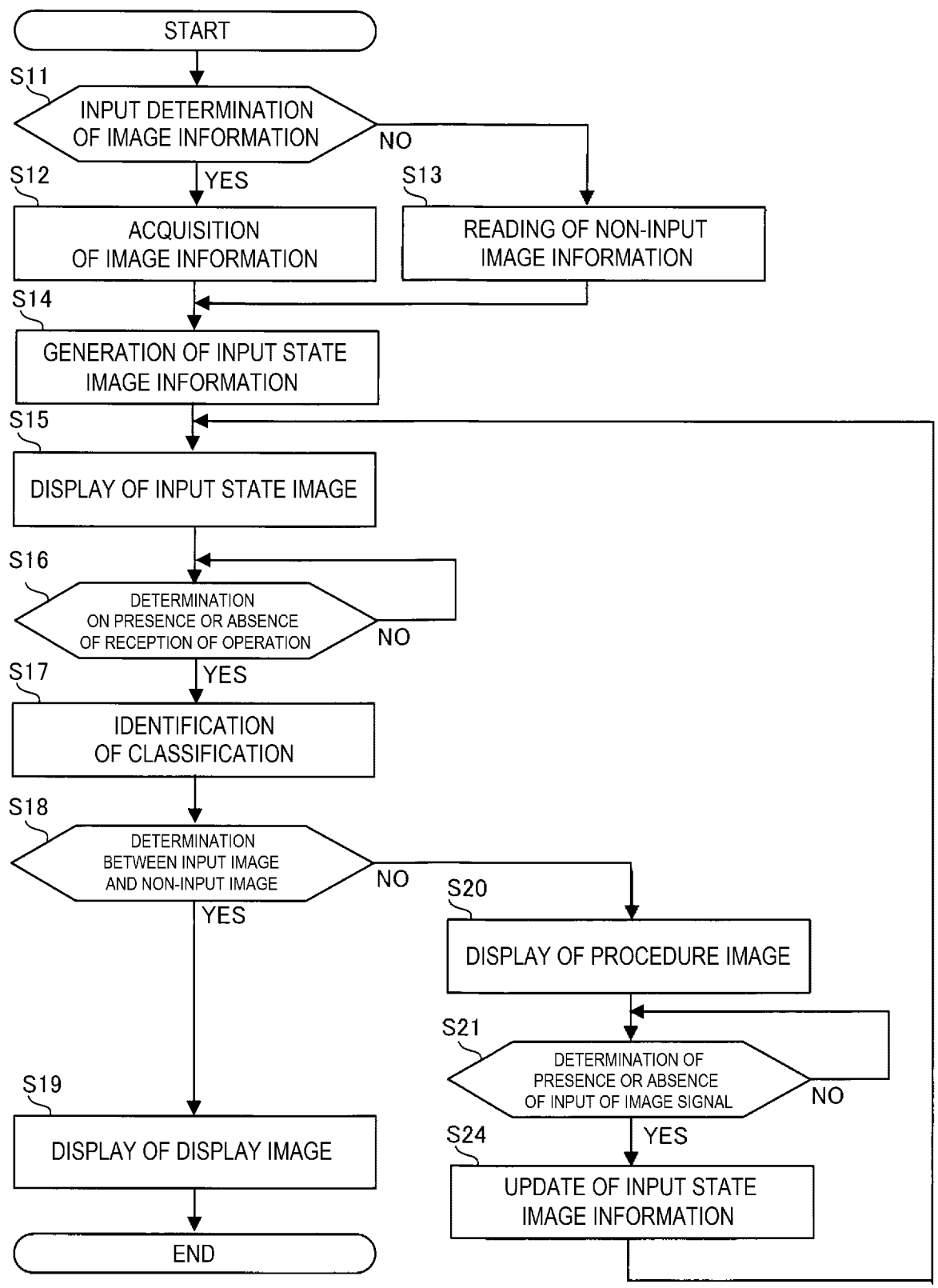
FIG. 13 is a flowchart showing a method of controlling a display device according to a third embodiment.

Then, a third embodiment of the present disclosure will be described. FIG. 13 is a flowchart showing a method of controlling the display device 10 according to the third embodiment. The present embodiment is different from the first embodiment in the point that the step S24 is provided. It should be noted that in the third embodiment, the detailed description of each of substantially the same matters as those of the first embodiment will arbitrarily be omitted using the same reference symbols as used in the description of the first embodiment.

As shown in FIG. 13, in the step S21, when the image information is input to the input interface 21 while displaying the procedure image Gb, the display control section 63 executes the process in the step S24. In the step S24, the display control section 63 newly generates or updates the input state image information Dh. The new input state image information Dh includes the information of the input image Gv formed based on the image information newly input to the input interface 21 in the step S21. Then, in the step S15, the display control section 63 inputs the new input state image information Dh to the image processing section 30, and then makes the display section 40 display the input state image Gh formed based on the new input state image information Dh. In other words, the display in the individual area A corresponding to the input interface 21 to which the image information has been input in the step S21 is changed from the non-input image Gu to the input image Gv.

In the present embodiment, when the image information is input to the input interface 21 while displaying the procedure image Gb, the new input state image Gh is displayed. Therefore, it is possible for the user to start to see the desired display image Ga at the own timing using the new input state image Gh.

It should be noted that it is also possible to display the report image Gd in the second embodiment between the step S21 and the step S24. It is possible for the report image Gd in this case to function as a message for informing the user of the fact that the image information has been input without receiving the operation by the user. In this case, it is possible for the display control section 63 to make the display section 40 display the report image Gd for a predetermined period of time, and then display the new input state image Gh.

4. Modified Examples

Each of the embodiments illustrated hereinabove can variously be modified. Some specific aspects of the modifications which can be applied to each of the embodiments described above will be illustrated below. Tow or more aspects arbitrarily selected from the following illustrations can arbitrarily be combined with each other unless conflicting with each other.

4-1. First Modified Example

Figure 14:
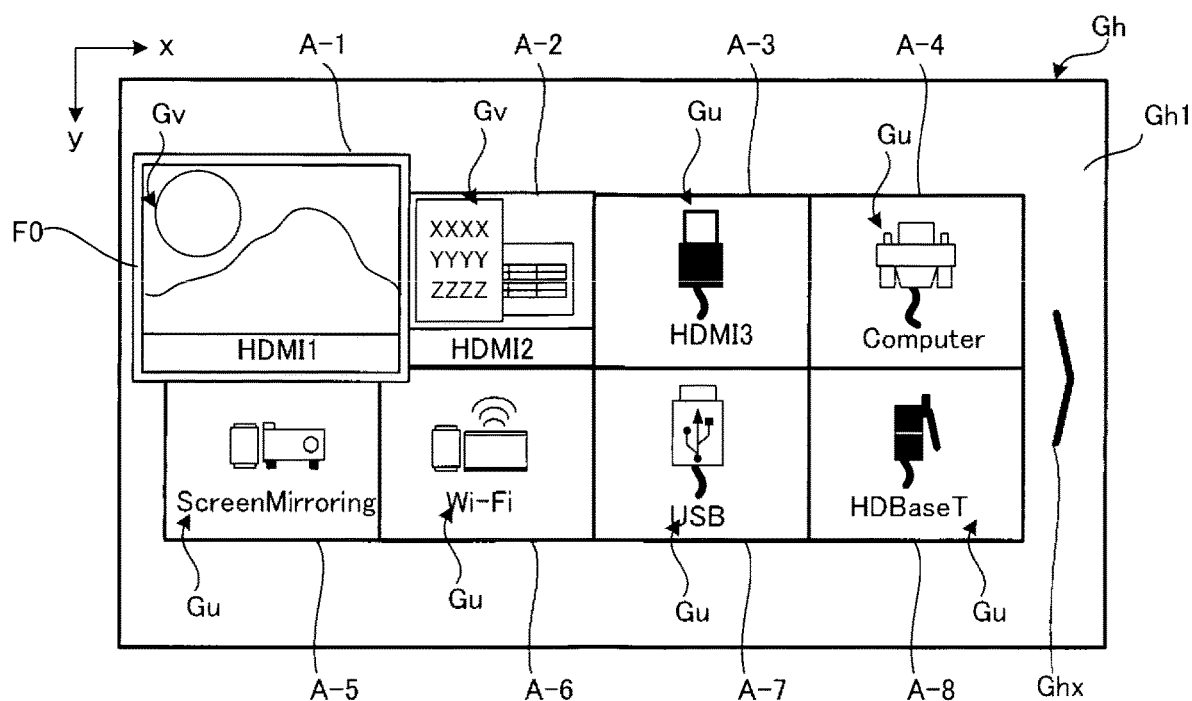
FIG. 14 is a diagram showing a modified example of the input state image.
Figure 15:
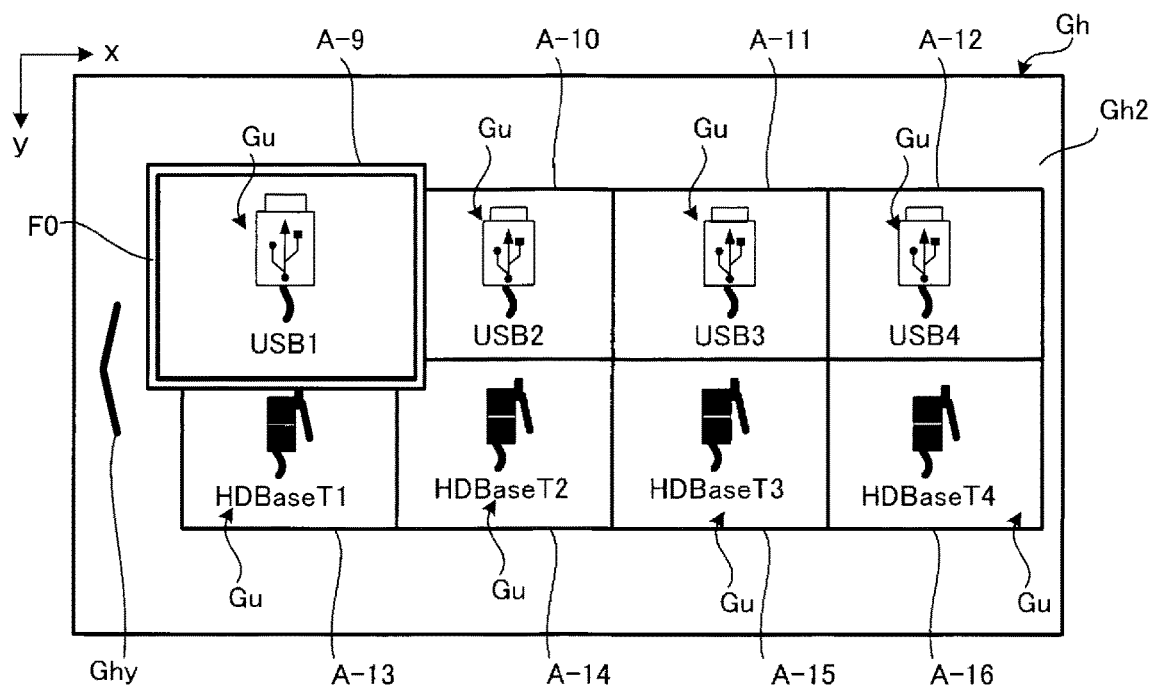
FIG. 15 is a diagram showing a modified example of the input state image.

The input state image Gh can be constituted by a plurality of pages. FIG. 14 and FIG. 15 are each a diagram showing a modified example of the input state image Gh. For example, a first page image Gh1 shown in FIG. 14 and a second page image Gh2 shown in FIG. 15 are included. In the input state image Gh, the display device 10 is provided with, for example, sixteen input interfaces 21. Therefore, the sixteen individual areas A-1 through A-16 are displayed in the input state image Gh. For example, the individual areas A-1 through A-8 are displayed in the first page image Gh1, and the individual areas A-9 through A-16 are displayed in the second page image Gh2. According to the input state image Gh shown in FIG. 14 and FIG. 15, it is not required to reduce the size of the individual area A in accordance with an increase in the number of the individual areas A. Therefore, it is possible to prevent the visibility of the input state image Gh from deteriorating. It should be noted that the display control section 63 makes the display section 40 change the display from the first page image Gh1 to the second page image Gh2 in accordance with the operation to the arrow key provided to the terminal device 100 by the user. For example, the display control section 63 makes the display section 40 display the first page image Gh1 or the second page image Gh2 in accordance with the operation to the terminal device 100 via an arrow symbol Ghx displayed in the first page image Gh1 and an arrow symbol Ghy displayed in the second page image Gh2.

4-2. Second Modified Example

Although each of the embodiments described above is an application example of the present disclosure to the projector, the present disclosure can also be applied to a device having a liquid crystal display as the display section 40 such as a portable information terminal such as a portable video game player, a smartphone, or a tablet terminal, a television receiver, or a car navigation system.

4-3. Third Modified Example

The input determination section 61, the identification section 62, and the display control section 63 in each of the embodiments described above are each a software module realized by the computer along the control program P1 as software. However, it is also possible to realize the input determination section 61, the identification section 62, and the display control section 63 with hardware such as an ASIC, and configure the display device 10 by combining the hardware with the I/F section 20, the image processing section 30, the display section 40, and the storage section 50.

4-4. Fourth Modified Example

In each of the embodiments described above, the control program P1 for making the control section 60 function as the input determination section 61, the identification section 62, and the display control section 63 is stored in advance in the storage section 50. However, the program for making a general-purpose computer function as the input determination section 61, the identification section 62, and the display control section 63 can be manufactured and then distributed as a unit. This is because by operating a computer in an existing display device along the program, it becomes possible to make the existing display device function as the display device 10. It should be noted that as a specific method of distributing the program described above, there can be cited an aspect of writing the program described above in a computer readable recording medium such as a flash ROM (Read Only Memory) to distribute the recording medium, and an aspect of distributing the program by downloading the program through a telecommunication line such as the Internet.

4-5. Fifth Modified Example

In each of the embodiments described above, in the input state image Gh, whether or not the image information has been input is displayed with respect to all of the input interfaces 21. However, it is not required to display whether or not the image information has been input with respect to all of the input interfaces 21 in the input state image Gh. It is also possible to display whether or not the image information has been input with respect to some of the input interfaces 21 out of all the input interfaces 21.

What is claimed is:

1. A method of controlling a display device including an input interface to which image information is input from an external device via a connector that is configured to be inserted in the input interface, and a display section configured to display an image, the method comprising:
   executing input determination on whether or not the image information is input to the input interface;
   displaying the input determination by making the display section display an input state image in accordance with a result of the input determination, the input state image being (i) an input image showing that the image information is input when the input determination indicates that the image information is input, and (ii) a non-input image showing that the image information is not input when the input determination indicates that the image information is not input;
   making the display section display a display image based on the image information when receiving an operation of designating the input image in a state in which the input state image including the input image is displayed; and
   making the display section display a procedure image representing a procedure of inputting the image information to the input interface when receiving an operation of designating the non-input image in a state in which the input state image including the non-input image is displayed,
   wherein the procedure image includes a shape of the input interface and a shape of the connector.

2. The method of controlling a display device according to claim 1, wherein
   when the image information is input to the input interface while displaying the procedure image, display of the procedure image is stopped, and the display section is made to display the display image.

3. The method of controlling a display device according to claim 1, wherein
   when the image information is input to the input interface while displaying the procedure image, the display section is made to display a report image representing that the image information is input.

4. The method of controlling a display device according to claim 1, wherein
   the input image is a thumbnail image to be displayed by reducing the display image.

5. A method of controlling a display device including a first input interface to which first image information is input from an external device via a first connector that is configured to be inserted in the first input interface, a second input interface to which second image information is input from the external device via a second connector that is configured to be inserted in the second input interface, and a display section configured to display an image, the method comprising:
   executing first input determination of determining whether or not the first image information is input to the first input interface, and second input determination of determining whether or not the second image information is input to the second input interface;
   displaying the first input determination by making the display section display a first input state image in accordance with a result of the first input determination, the first input state image being (i-a) a first input image showing that the first image information is input when the first input determination indicates that the first image information is input, and (i-b) a first non-input image showing that the first image information is not input when the first input determination indicates that the first image information is not input;
   displaying the second input determination by making the display section display a second input state image in accordance with a result of the second input determination, the second input state image being (ii-a) a second input image showing that the second image information is input when the second input determination indicates that the second image information is input, and (ii-b) a second non-input image showing that the second image information is not input when the second input determination indicates that the second image information is not input;
   making the display section display one of a first display image based on the first image information and a second display image based on the second image information in accordance with an operation of designating one of the first input image and the second input image when receiving the operation; and
   making the display section display one of a first procedure image representing a procedure of inputting the first image information to the first input interface and a second procedure image representing a procedure of inputting the second image information to the second input interface in accordance with an operation of designating one of the first non-input image and the second non-input image when receiving the operation, wherein the procedure image includes a shape of the first input interface, a shape of the first connector, a shape of the second input interface and a shape of the second connector.

6. A display device comprising:
a display section configured to display an image;
an input interface to which image information is input from an external device via a connector that is configured to be inserted in the input interface;
an input determination section configured to execute input determination on whether or not the image information is input to the input interface; and
a display control section configured to display the input determination by making the display section display an input state image in accordance with a result of the input determination, the input state image being (i) an input image showing that the image information is input when the input determination indicates that the image information is input, and (ii) a non-input image showing that the image information is not input when the input determination indicates that the image information is not input, wherein
the display control section makes the display section display
 a display image based on the image information when receiving an operation of designating the input image, and
 a procedure image representing a procedure of inputting the image information to the input interface when receiving an operation of designating the non-input image, the procedure image including a shape of the input interface and a shape of the connector.

* * * * *